INVENTORS
MARIO MARTELLOTTI
JAMES W. EVANS
BY
ATTORNEYS

INVENTORS
MARIO MARTELLOTTI
JAMES W. EVANS

ATTORNEYS

United States Patent Office 2,773,968
Patented Dec. 11, 1956

2,773,968

ELECTRO DISCHARGE MACHINE

Mario Martellotti and James W. Evans, Cincinnati, Ohio, assignors to The Cincinnati Milling Machine Co., Cincinnati, Ohio, a corporation of Ohio Application January 10, 1956, Serial No. 558,252

19 Claims. (Cl. 219—69)

This invention relates generally to machine tools and more particularly to a new and improved universal electrical discharge type drilling and boring machine.

The machine tool industry is constantly striving to keep pace with metallurgical developments by continually providing new and improved machining methods and means whereby industry may realize an immediate enjoyment of new alloys. Today with the development of such alloys as tungsten, sintered and cemented carbides, and the like, which are virtually unmachinable with present tools, diamond tipped tools have for some time been the only practical means for machining such materials. This, of course, involves a costly, complicated, and time-consuming machining operation.

The method of machining such materials by electrical discharges, in which there is no actual physical contact between the cutting tool and the work, has proved to be most satisfactory due to the ease, simplicity and relatively high degree of machining accuracy obtainable with a relatively inexpensive and easy-to-form cutting element. The cutting element, which is in the form of an electrode, may be composed of any ductile electrical conductive material such as brass or the like.

In addition, prior conventional methods of machining such materials have been limited to the formation of straight walled holes or slots having generated and geometric surfaces, thus limiting the flexibility of the machine, whereas the electrical discharge method of machining has the additional characteristics that irregular shaped through or blind holes may be trepanned or otherwise formed in a work piece. The bottom surface of the blind holes or depressions thus formed may also be machined to exhibit any prescribed surface contour, thus making such a machining method particularly applicable and useful in die sinking, engraving, and other such allied fields.

One of the principal objects of this invention is to devise a new and improved electrical discharge drilling and boring machine that will be completely flexible to automatically produce straight, curved, inclined, tapped, tapered and other generated holes and also various combinations thereof, thus making the machine completely universal to the point of adaptability to meet the great diversity of cycles of operation demanded by various manufacturing needs.

Another object of this invention is to devise a new and improved electrical discharge type drilling and boring machine having the additional characteristic that the cutting element or electrode may possess independently controlled movements such as normal axial feeding, rotation about its own axis, and planetary translation or rotation about a generating axis either parallel to or at a predetermined inclination to such axis.

A further object of this invention is to devise a new and improved electrical discharge type drilling and boring machine in which the aforementioned independently controlled electrode movements may be variously combined to produce a variety of predetermined resultant movements thereof limited only by the ingenuity of the operator.

Still another object of this invention is to devise a new and improved electrical discharge drilling and boring machine for the purposes described that is highly accurate, of light construction, simple, and inexpensive because there is no cutter thrust reaction on the tool head due to non-contact of tool with work.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

With reference to the drawings in which like reference numerals denote like or similar parts.

Figures 1, 2, 3, 4, 5:
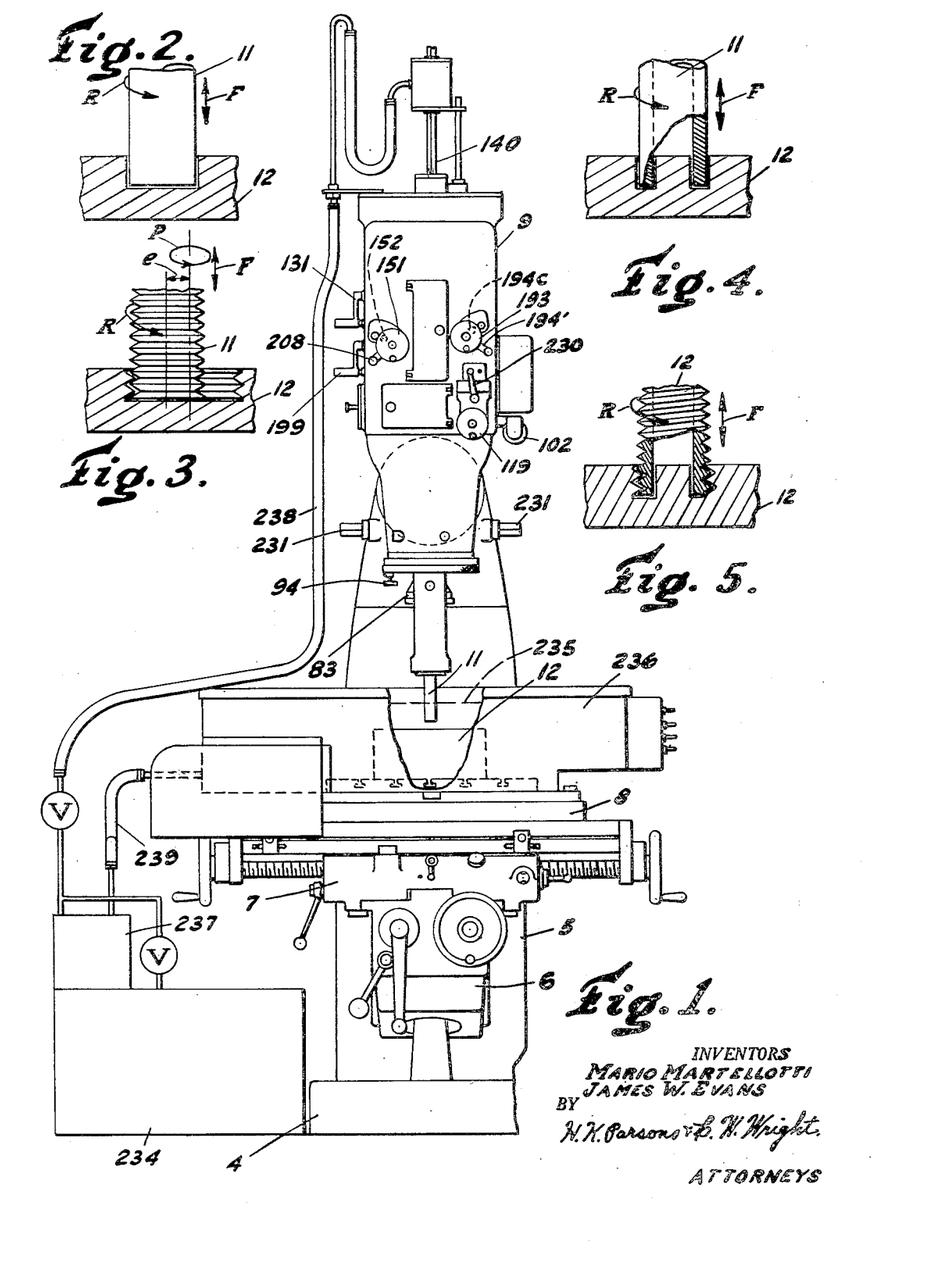
Figure 1 is a front elevational view of the machine structure.
Figures 2, 3, 4, 5, 6, 7, and 8 are diagrammatic views illustrating various electrode configurations combined with variously controlled electrode movement to produce some of the most obvious hole formations and configurations.
Figures 6, 7, 8, 9:
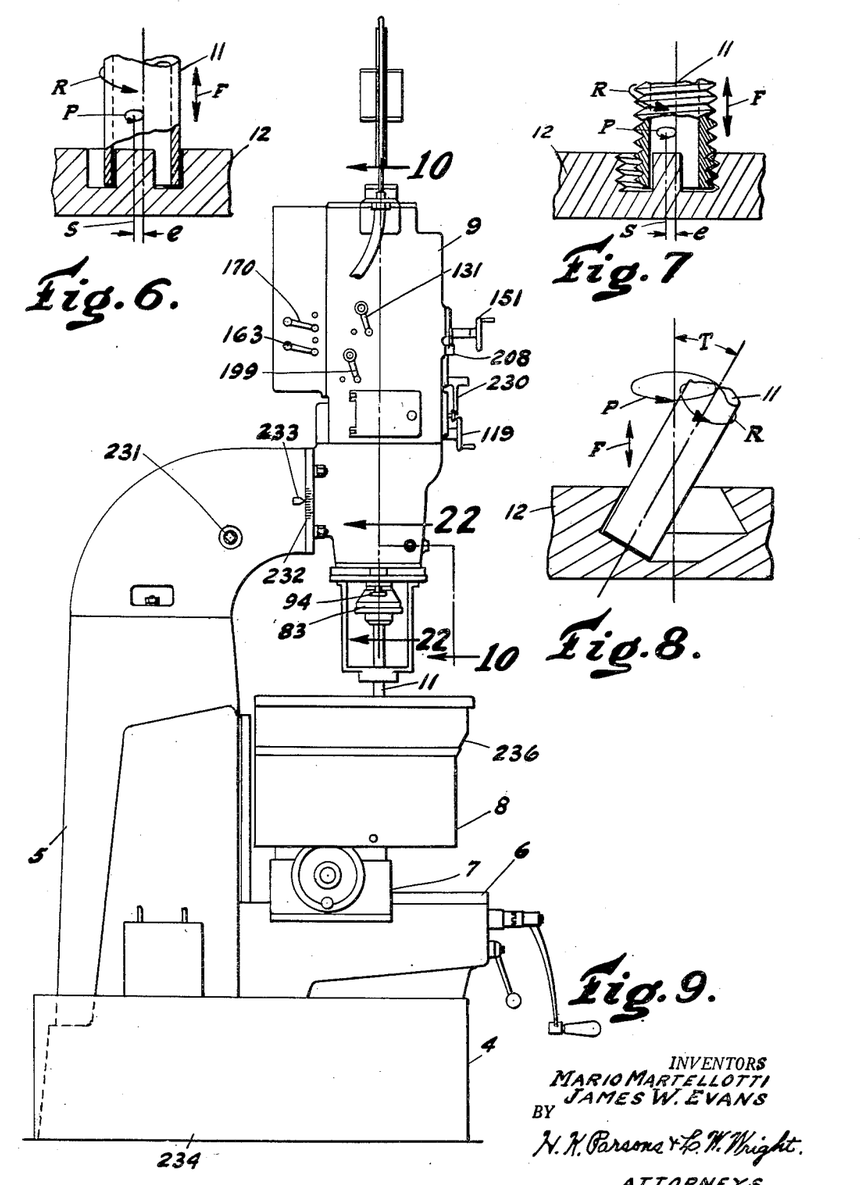
Figure 9 is a side elevational view of the machine structure as viewed from the left of Figure 1.

In accordance with the present invention, the foregoing objects and advantages are accomplished by the provision of a machine as shown in Figures 1 and 9 of the drawings, which has essentially a base 4, a column 5 mounted on said base 4, a knee 6 slidably mounted on said column 5, a saddle 7 slidably mounted on the knee 6 and a table 8 slidably mounted on the saddle 7 whereby three directional movements may be made to position the work 12 affixed to the table 8 relative to an electrode supporting tool head structure pivotally mounted on the upper end of said column 5 in spaced relation to said table 8. The tool head 9 consists essentially of a telescoping sleeve assembly journaled therein which operatively supports a disintegrating tool element or electrode 11 in the innermost sleeve thereof.

Various power operable means have been provided in the head 9 including proper gearing selector, and clutching means for driving the electrode and sleeve assembly to effect various independent and/or coordinated movements of the electrode with respect to the work. The said movements consist essentially of normal axial feeding of the electrode 11 toward and from the work 12 either perpendicular to or at a prescribed inclination with respect to the plane of the table or work support 8, rotation of the electrode 11 about its own axis either independent or in coordination with the feeding movement; and planetary rotation of the electrode 11 in a prescribed orbit, the axis of which is substantially perpendicular to the plane of said work support 8 and either independent of or coordinated with the feeding and/or rotation of said electrode 11.

Figure 25:
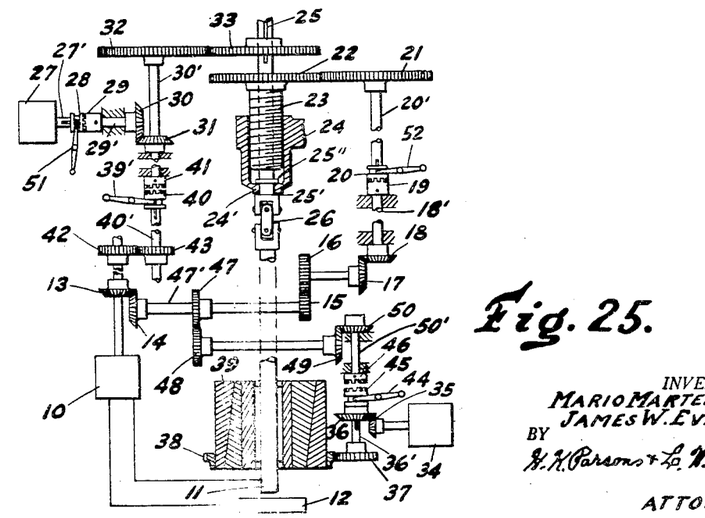
Figure 25 is a diagrammatic representation of the power trains for driving the electrode, their interrelations and interconnections.

A diagrammatic representation of a transmission mechanism including the various branch transmissions and selector clutches for alternatively effecting the various movements of the electrode 11 is shown in Figure 25 of the drawings. This representation is illustrative only of the principles involved and the actual construction of the parts in the machine will be described later. In the art of discharge machining the electrode is fed toward the work at a rate not greater than the rate of metal removal to insure against short circuiting conditions and therefore the rate of feed movement must be controlled by the electrical conditions in the sparking gap between the electrode and the work. To maintain this timed relation a servo-motor 10 has been provided and the rate and direction of rotation of the motor are controlled by the electrical conditions existing across the discharge gap between the electrode 11 and the work 12. The servo-motor 10 is connected by a feed transmission to the electrode 11, and this transmission is illustrated in Figure 25 by the gears 13, 14, 15, 16, 17, 18, the gear 18 being supported on a shaft 18' which terminates in a clutch member 19. A shiftable clutch member 20 on the shaft 20' is operable to connect or disconnect the shaft 18' with respect to the shaft 20'. The shaft 20' carriers a gear 21 meshing with a gear 22 formed integral with a screw 23, which is threaded in a housing 24. A shaft 25 passes through the screw 23 and is rotatably and axially movable relative to the screw. The shaft 25 is fixed for movement with the housing 24 by means of the shouldered member 25' and the collar 25" fixed to the shaft on opposite sides of the wall 24' of the housing 24. Thus, as the nut 24 is moved by the screw, the shaft 25 moves with it. A separate transmission including an auxiliary motor 27 is provided to effect independent rotation of the shaft 25 and thereby of the electrode operatively connected thereto, and this transmission train includes the clutch members 28 and 29, the clutch member 29 being connected to the end of the fixed shaft 29' and the clutch member 28 being splined on the end of the output shaft 27' of the auxiliary motor 27. Thus, the motor may be connected or disconnected with respect to the shaft 29'. A pair of bevel gears 30, 31 connects the shaft 29' through the shaft 30' to the gear 32 which meshes with the gear 33 having a splined connection to the shaft 25. By this transmission means the shaft 25 may be rotated at a rate independent of the feed rate. A second auxiliary transmission is provided for effecting rotation of the sleeve assembly comprising a prime mover 34 connected by bevel gears 35 and 36 to shaft 36' which carries gear 37 meshing with gear 38 of the sleeve assembly 39.

The bevel gear 36 is splined on the end of shaft 36' and carries clutch teeth 45 whereby when the gear is shifted by the lever 44 the gear 36 is disconnected from the bevel gear 35, and the clutch teeth 45 are engaged with the teeth of the clutch member 46 fixed to the end of shaft 50'. This arrangement provides an alternative connection whereby the motor 34 may drive the gear 37, or the shaft 50' may be connected to drive the gear 37 independent of the motor 34. The shaft 50' is connected by the bevel gear pair 49—50, and the spur gear pair 47—48 to the output shaft 47' of the servo-motor, which shaft carries the gears 14 and 15 which are part of the feed transmission train from the servo-motor 10. Thus, the servo-motor may be simultaneously connected to effect a feeding movement of the electrode and simultaneous rotation of the sleeve assembly. In addition, the servo-motor has a connection through gears 42 and 43 to a clutch 40 splined on the end of supporting shaft 40'. By shifting the clutch 40 by its operating lever 39' into engagement with the clutch 41 fixed to the end of shaft 30', and disconnecting clutch 28, the servo-motor may be connected to effect rotation of the electrode independent of the prime mover 27. It will thus be seen that the servo-motor may be utilized alone to effect the feeding movement, or may be connected alternatively to rotate the sleeve assembly, or the electrode, or both simultaneously.

Figures 17, 18, 19, 20, 21:
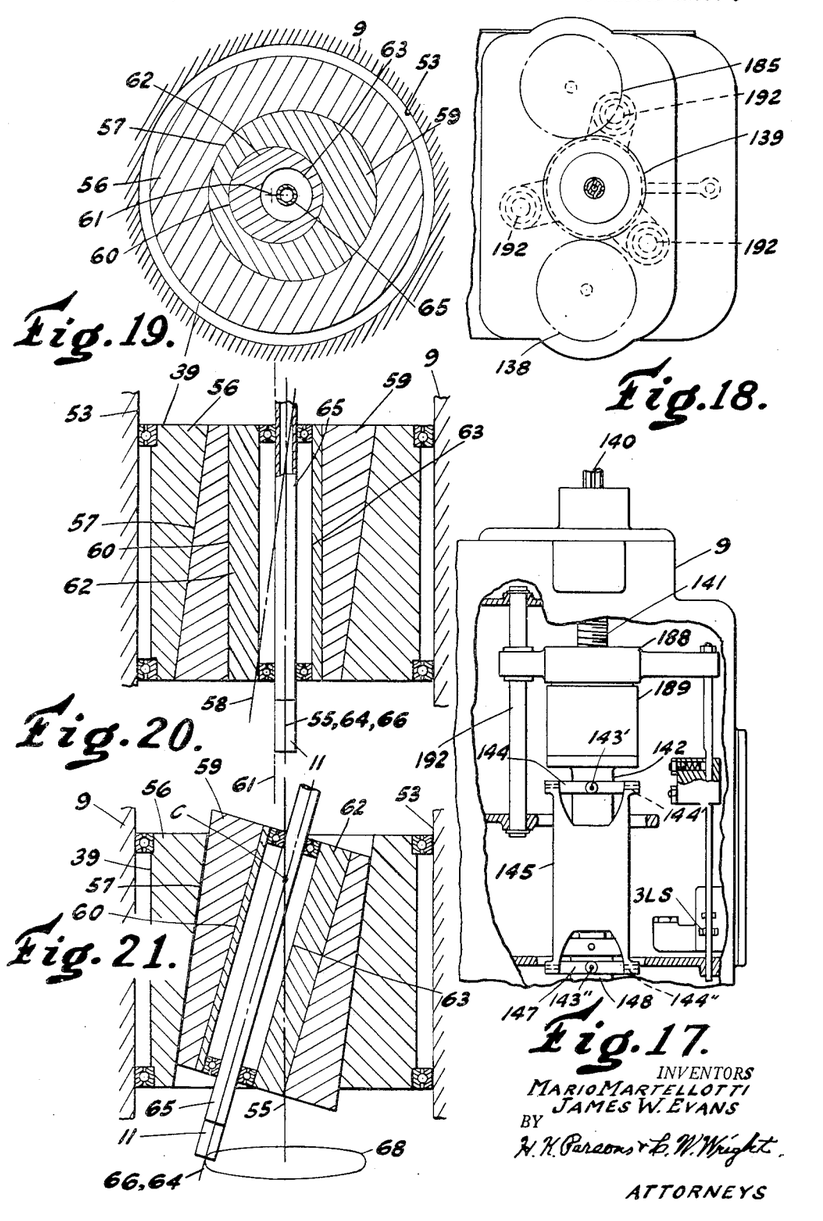
Figure 17 is a cut-away elevational view of the electrode supporting head along the line 17—17 of Figure 1.
Figure 18 is a partial plan view of the electrode supporting head shown in Figure 17.
Figures 19, 20, and 21 are diagrammatic representations of the telescoping sleeve assembly.

With reference to Figure 20 of the drawings, the said telescoping sleeve assembly, indicated generally by the reference numeral 39, is journaled in a bore 53 formed in said head 9 for rotation about axis 55. The axis 55 is perpendicular to the plane of the worktable 8 of the machine. The sleeve assembly 39 includes an outer right sleeve 56 rotatably mounted in said head bore 53 and having an inclined bore 57 containing a taper setting sleeve 59. The axis 58 of the bore 57 is inclined with respect to the axis of rotation of the head 53 and intersects this axis. It is the physical size of the parts that determine where this point of intersection is as will be explained in the specification. The taper setting sleeve 59, referred to herein as the central sleeve, is journaled in the inclined bore 57 for rotatable adjustment to set the angle of inclination or taper of the electrode when needed. The sleeve 59 has bore 60 which is inclined to its own axis, and the axis 61 of this bore is normally arranged parallel to the axis of rotation of the head when there is no angular adjustment. This bore contains the quill 62 for the electrode spindle, said quill being shown herein as the inner sleeve. The quill 62 has a bore 63 containing the spindle 65. The parts may be so constructed that the axis of the spindle is coincident to the axis of rotation of the head in one position of the quill, whereby rotation of the quill will eccentrically position the spindle. It will now be seen that when all the sleeves are adjusted to the position shown in Figure 19 with the spindle 65 in the center of the sleeve assembly, that the quill is rotatable to change the eccentricity of the spindle, and the taper adjusting sleeve 59 is rotatable to change the angle of inclination of the spindle whether eccentrically adjusted or not, and that the whole assembly may be rotated with the spindle in any of its adjusted positions.

The effect of these various adjustments will now be described. Suppose that it is desired to tap, or simultaneously drill and tap a straight hole automatically. Therefore, utilizing a threaded electrode, proper ratio gearing means, as shown diagrammatically in Figure 25 of the drawings, has been provided to effect a coordinated or synchronized axial rotation of the electrode 11 with respect to the normal feeding thereof toward the work 12. The ratio of coordination of electrode feed with rotation will, of course, be in accordance with the lead of the threaded electrode.

Figures 14, 15:
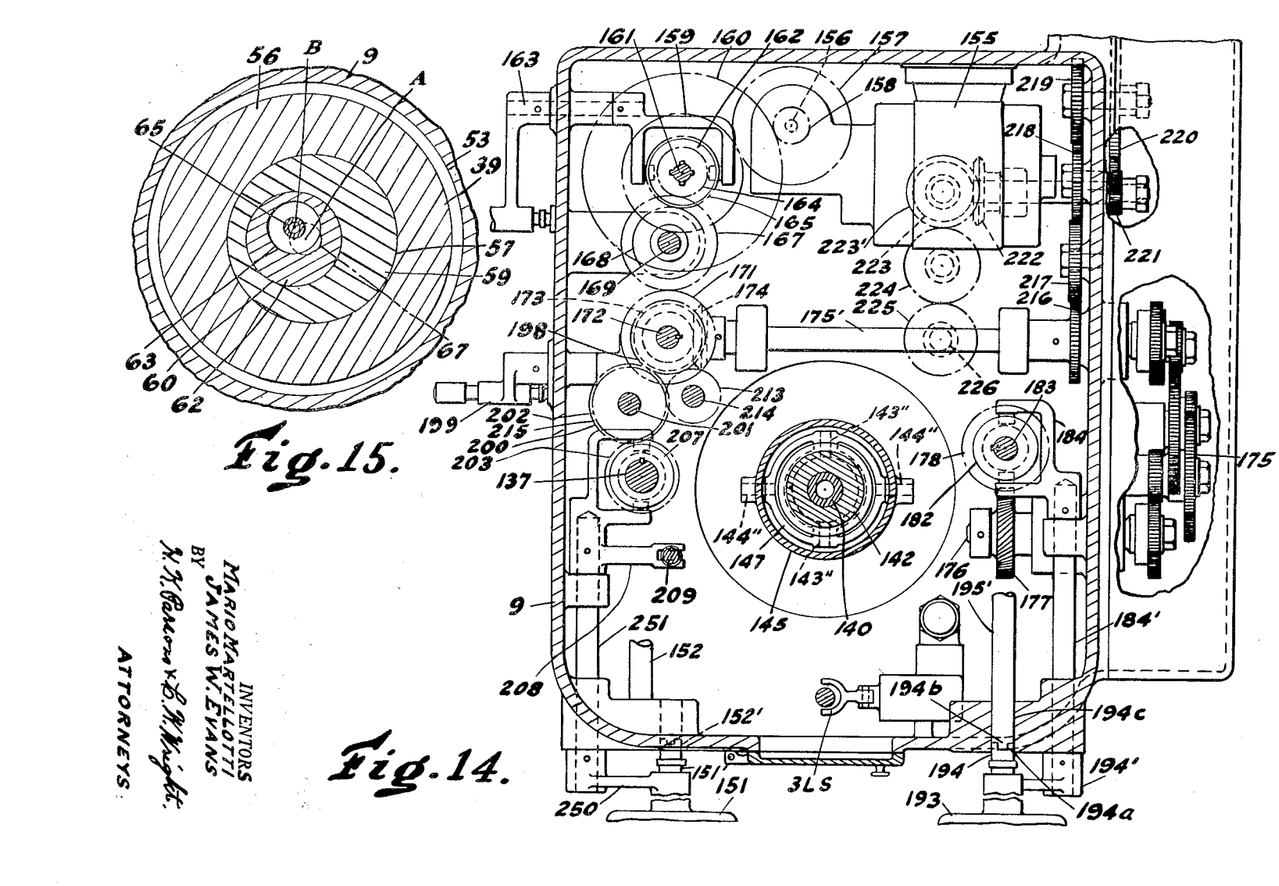
Figure 14 is a sectional view of the gearing mechanism utilized for effecting variously coordinated electrode movements as viewed along the line 14—14 of Figure 10.
Figure 15 is a diagrammatic representation of the telescoping sleeve assembly.

Suppose now, that it is desired to drill a hole of larger diameter than the diameter of the electrode 11 in precise increasing increments. With reference to Figure 15 of the drawings, which is illustrative only, the aforementioned inner sleeve 62 of the said telescoping sleeve assembly 39 may be rotatably adjusted, say 90 degrees counterclockwise, with respect to the central sleeve 59 as shown while the outer sleeve 56 is held stationary and then locked in said adjusted position. Thus, the axis of the spindle 65 and attached electrode will be eccentrically or laterally shifted from point A to point B by varying amounts which will be directly proportional to the amount of said rotational adjustment. Now, as the telescoping sleeve assembly 39 is rotated as a unit, the spindle 65 and thus the electrode 11 will be translated or bodily rotated in a planetary orbit 67, the radius of which will be directly proportional to the degree of said eccentricity or rotational adjustment.

It can, therefore, be seen that the diameter of successive holes to be formed in the work may be increased in successive incremental steps simply by varying or adjusting the degree of eccentricity. The diameter of the holes thus drilled will be equal to the diameter of the electrode 11 plus the diameter of the planetary orbit 67. This is again illustrated in Figure 13 in which the degree of eccentricity adjustment has been changed or increased from 90 degrees to 180 degrees counterclockwise and thus the diameter of the electrode planetary orbit 67 has become proportionally greater in magnitude.

Suppose now that it is desired to tap, or simultaneously drill and tap automatically a variation of hole sizes that will be of greater diameter than the diameter of the tapping electrode. This is accomplished by again adjusting the degree of eccentricity of the electrode 11 as heretofore described and utilizing an annular grooved electrode instead of a threaded electrode that is independently rotated at any constant rate about its own axis by auxiliary motor 27, as shown in Figure 25 of the drawings. Proper gearing means have been provided, as shown diagrammatically in Figure 25, to effect a coordinated planetary rotation of the electrode 11 with the feed thereof as heretofore shown, in accordance with the lead of the thread to be produced in the work. Therefore, it can be seen that if the planetary rotation or translation of the electrode is coordinated with the feed thereof, it is possible to tap, or drill and tap, simultaneously, a hole the diameter of which will again be equal to the diameter of the electrode 11 plus the diameter of the planetary orbit 67.

Suppose that it is desired to drill a variation of tapered holes in the work. With reference to Figure 21 of the drawings, which is illustrative only, the aforementioned outer sleeve 56 of the said telescoping sleeve assembly 39 may be rotatably adjusted with respect to the central sleeve 59, as shown, while the inner sleeve 62 is held stationary, and then locked in said adjusted position. The axis 66 of the electrode 11 will be inclined or tilted selective amounts with respect to the axis 55 of said head bore 53 dependent upon said rotational adjustment. As the telescoping sleeve assembly 39 is rotated as a unit by the auxiliary motor 34, as heretofore shown in Figure 25 of the drawings, the lower end of the electrode 11 will be translated or bodily rotated in a planetary orbit 68 due to the pivoting or "wobbling" action of the spindle 65 about the point C which is determined by the intersection of the spindle or electrode axis 66 with the axis 55 of said head bore 53. The position of the point of intersection C along the axis 55 of the head bore 53 and degree of tilt of spindle will determine the diameter of the said planetary path of rotation 68 which, in turn, is determined by the degree of tilt of the spindle 65 and electrode 11. The planetary orbit 68 progressively increases in diameter as the electrode 11 is fed forward so that a tapered hole will be drilled or otherwise formed in the work, with the degree of taper thereof equal to the tilt adjustment of the electrode 11.

Suppose now that it is desired to tap, or simultaneously drill and tap a variation of tapered holes in the work piece without the necessity of changing electrodes. This can be done by utilizing an annular grooved electrode which is rotated simultaneously and independently at a constant rate about its own axis. Proper gearing means have been devised, as shown diagrammatically in Figure 25 of the drawings, to effect a coordinated translation or planetary rotational movement of the electrode 11 in the orbit 68 with the feed thereof in accordance with the lead of the thread to be produced in the work. Therefore, it can be seen that a tapered hole will be simultaneously drilled and tapped automatically in the work with the degree of taper thereof equal to the degree of tilt of the electrode 11.

It should now become obvious that if both the inner and outer sleeves 62 and 56 respectively of the telescoping sleeve assembly 39 are both rotatably adjusted with respect to the central sleeve 59 and then locked in said adjusted position, the axis 66 of the electrode 11 will first be eccentrically offset and will, in addition, be inclined with respect to the axis 55 of said head bore 53. Therefore, as the telescoping sleeve assembly 39 is rotated as a unit, a tapered hole will automatically be drilled or otherwise formed in the work with the degree of taper thereof equal to the amount of tilt adjustment of the electrode 11 and the size or diameter of the small end of the tapered hole being equal to the diameter of the electrode 11 plus the diameter of the planetary orbit 67 or twice the degree of eccentric adjustment of the electrode 11.

A more complete understanding may be had upon analysis of Figures 2 to 8 inclusive wherein the foregoing principles are diagrammatically illustrated. With reference to Figure 2 of the drawings, one type of machining operation is illustrated utilizing a solid electrode 11 whereby all of the metal or material removed from the work piece 12 will be disintegrated. In this particular type of operation in which a straight hole is drilled it is not necessary to coordinate the feed rate F of the electrode 11 with the axial rotation R thereof about its own axis. Figure 4 illustrates another type of machining operation in which a hollow electrode 11 is utilized so that a doughnut-shaped hole will be drilled or otherwise formed in the work 12. Again, in this type of operation it is not necessary to coordinate the axial rotation R of the electrode 11 with the feed F thereof. Figure 5 illustrates a method of simultaneously drilling and tapping a hole with the use of a hollow electrode 11 whereby the axial rotation R of the electrode 11 about its own axis is coordinated with the feed F thereof corresponding to the thread to be produced in the work 12. A solid but threaded electrode 11 may be substituted in its stead, thereby producing the same results.

Figure 3 illustrates a second method of simultaneously drilling and tapping a straight hole by utilizing an annular grooved electrode 11 which is rotated about its own axis at an independent rate. Therefore, it is necessary only to coordinate the planetary rotation P of the electrode 11 with the feed rate F thereof corresponding to the lead of the thread to be produced in the work 12. The diameter of said hole thus drilled and tapped will be equal to the diameter of the electrode 11 plus twice the value of the eccentricity adjustment e. Figure 6 illustrates a method of drilling a straight hole that will be larger in diameter than the electrode diameter. A hollow electrode 11 is utilized and is rotated independently about its own axis S and is fed toward the work 12 independently and at the same time rotated or bodily moved in a planetary orbit, the magnitude of which is dependent upon the degree of eccentricity adjustment e. Therefore, it can be seen that various diameter holes may be formed in the work 12 exceeding the diameter of the electrode 11 itself merely by adjustment of the eccentricity adjustment e.

Figure 7 illustrates a third method of simultaneously drilling and tapping a hole that will be larger in diameter than the diameter of the electrode 11 with the use of a hollow and threaded electrode 11. In this type of operation it is necessary to coordinate the planetary rotational movement P in an orbit the diameter of which is to be determined by the eccentricity adjusment $e$ and the axial rotation R of the electrode 11 about its own axis with the feed F of the electrode 11 toward the work 12. Therefore, it can be seen that various diameter holes may be simultaneously drilled and tapped in the work piece 12 without the necessity of changing electrodes for each hole size. Figure 8 illustrates another method of drilling a tapered hole in which the electrode 11 is inclined an amount equal to the desired taper to be produced in the work 12. The electrode 11 may be independently rotated about its own axis R and fed toward the work 12 while at the same time being bodily moved in a planetary orbit P determined by the degree of tilt adjustment T. The size of the tapered hole thus produced may also be increased by eccentricity adjustment of the electrode 11 as heretofore shown.

Again, too, it is obvious that if an annular grooved or threaded electrode is used that it is now possible from the foregoing discussion to tap or simultaneously drill and tap a tapered hole, the degree of taper thereof equal to the tilt of the electrode 11, and the size of the tapered hole directly proportional to the eccentricity adjustment $e$.

There has thus been discussed various methods for forming the most obvious hole formations that are made possible by this invention, but upon comprehension of the following specification and claims it will become more obvious to those skilled in the art that other hole formations have been rendered available to be limited only by the ingenuity of the operator and thus making the machine completely universal to the point of adaptability to meet the great diversity of cycles of operation as demanded by various manufacturing needs.

It might be well to note at this point that the preceding description of the specification was intended to be illustrative only to depict a general and simplified embodiment of the invention whereas the following specification will depict a more detailed and specific embodiment of the said invention.

Figures 10, 11, 12, 13:
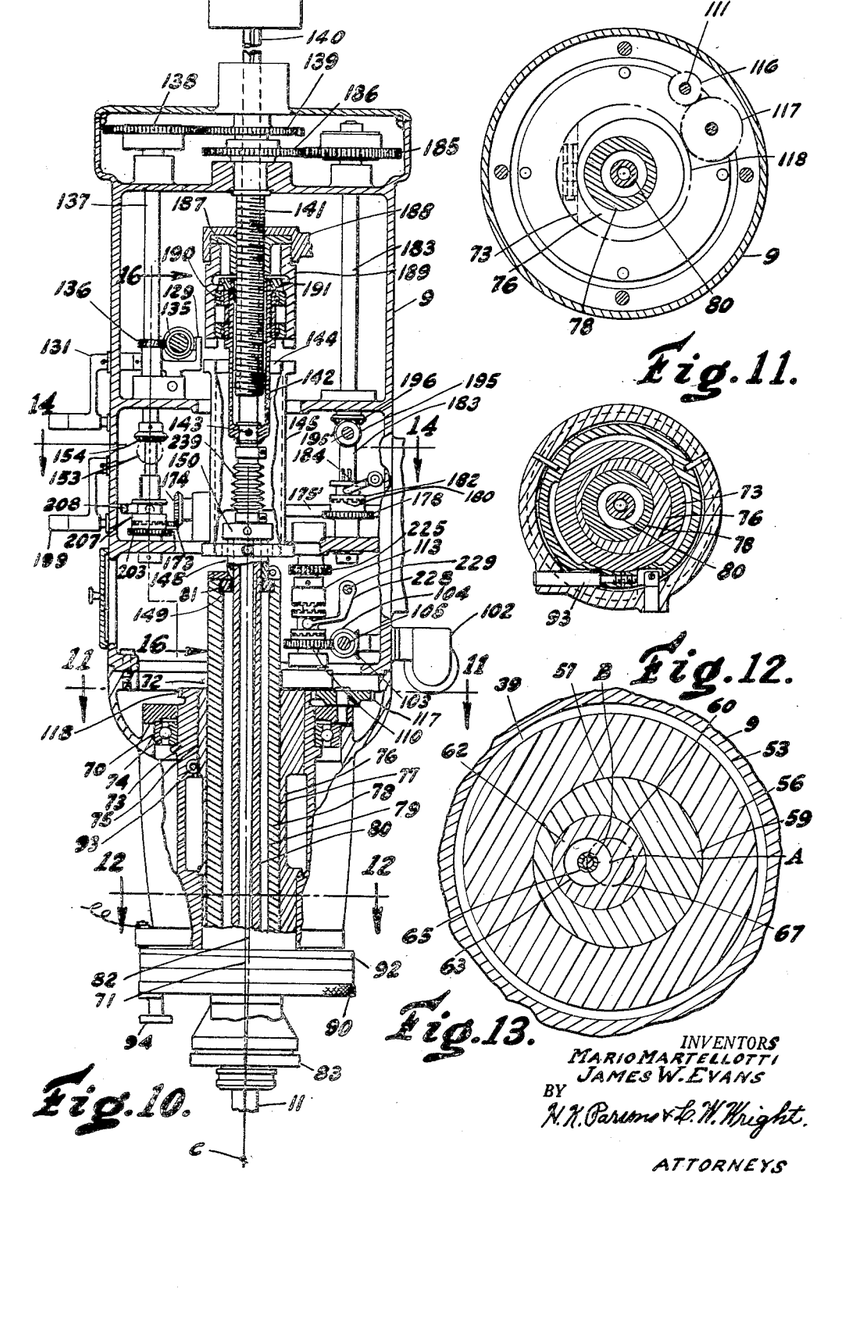
Figure 10 is a sectional view of the electrode supporting head as viewed along the line 10—10 of Figure 9.
Figure 11 is a sectional view depicting the driving means for rotating the telescoping sleeve assembly as viewed along the line 11—11 of Figure 10.
Figure 12 is a sectional view of the telescoping sleeve locking assembly as viewed along the line 12—12 of Figure 10.
Figure 13 is a diagrammatic representation of the telescoping sleeve assembly.

With reference to Figure 10 of the drawings, the said electrode supporting head structure, indicated generally by the reference numeral 9, operatively supports an electrode 11 in spaced relation to the work support. The head 9 has a vertical bore 70 formed in the lower end thereof for receiving and supporting the telescoping sleeve assembly indicated generally by the reference numeral 72, having an axis of rotation 71. The sleeve assembly includes an outer sleeve 73 rotatably mounted in the bore 70 by means of bearings 74. The sleeve 73 has a bore 75 formed therein at an inclination to the axis 71 of said bore 70 and a central sleeve 76 rotatably mounted in the bore 75. The sleeve 76 has a bore 77 formed therein, the axis of which is eccentrically displaced with respect to the axis 71 for rotatably supporting the quill or inner sleeve 78, which quill has a bore 79 in which is mounted the spindle 80. It will be noted that said telescoping sleeve assembly 72 is substantially identical with said telescoping sleeve assembly 39 as shown in Figures 20 and 21 of the drawings which has heretofore been fully described.

Since it is more efficient to carry out the machining operation in the presence of a dielectric coolant in order to effectually cool and to facilitate the removal of swarf-like particles derived therefrom, the hollow spindle 80 has been provided and is journaled in said inner sleeve 78 by means of proper bearings 81, with the axis 82 thereof normally coincident with the axis 71 of said head bore 70.

Figure 22:
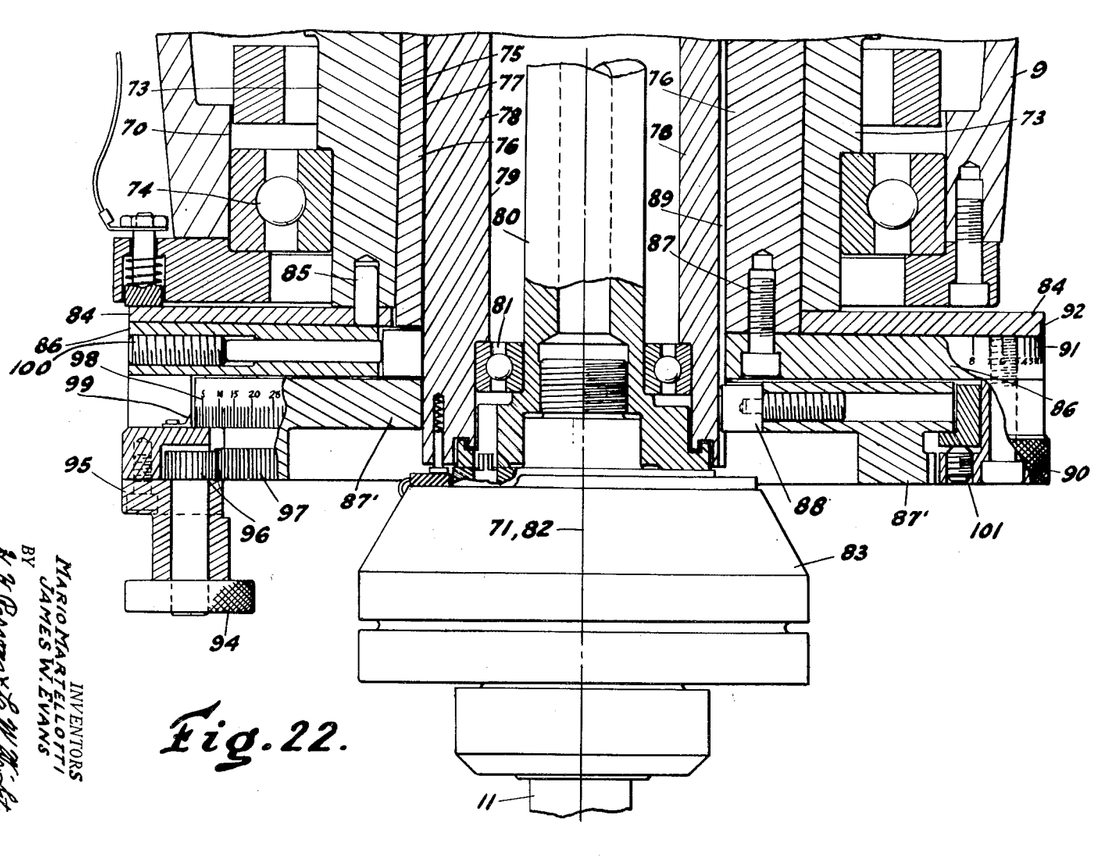
Figure 22 is a sectional view of the electrode supporting head depicting the eccentricity and tilt adjusting mechanism as viewed along the line 22—22 of Figure 9.

With reference to Figure 22 of the drawings, means have been provided to adjust the angular position of the central and inner sleeves 76 and 78 respectively with respect to the outer sleeve 73 to effect tilting and/or lateral shifting of the spindle 80. The electrode 11 is connected to the spindle by means of a conventional chucking mechanism 83 threaded in the end of the spindle.

The sleeve adjusting means consists essentially of a first circular plate 84 integrally connected to the outer sleeve 73 by action of a pin 85 and having the bottom surface thereof beveled at an angle equal to one half the maximum angle of tilt of the spindle 80. A second circular plate 86 is provided and is integrally connected to the central sleeve 76 by action of bolt 87 threaded therein, the top surface of said second plate 86 being beveled in complimentary relationship with the beveled surface of said first circular plate 84. A third circular plate 87' is provided and is so connected so as to rotate the quill or inner sleeve 78 by action of a key 88 riding in a spline 89 formed vertically along the outer surface of the inner sleeve 78. This permits axial feeding of the quill and spindle without rotation of the quill, although the spindle is rotating inside the quill.

A knurled knob or handwheel 90 is formed on the periphery of the said second plate 86 such that as the second plate 86 is rotated with respect to the first plate 84, the central sleeve 76 will be rotated with respect to the outer sleeve 73 and thus axis 82 of the spindle 80 will be tilted with respect to the axis 71 of said head bore 70 selected amounts as read on a scale 91 formed on said second plate 86 with respect to a zero mark 92 formed on the first plate 84. The said outer and central sleeves 73 and 76 respectively may be locked in said adjusted position by action of a suitable locking means as indicated generally by the reference numeral 93 as shown in Figure 10 and 11 of the drawings.

A second adjusting knob 94 has been provided and is journaled in a member 95 integrally connected to said second plate 86 and having a pinion gear 96 formed on the end thereof in engagement with a gear 97 formed along the periphery of said third plate 87' such that as the knob 94 is rotated, the third plate 87' will be rotated with respect to the second plate 86, thereby rotating said inner sleeve 78 with respect to the central sleeve 76 so that the axis 82 of the spindle 80 will be laterally shifted with respect to the axis 71 of said head bore selected amounts as read on a scale 98 formed on said third plate 87' with respect to a zero mark 99 formed on the member 95.

The said inner and central sleeves 78 and 76 respectively may be locked in said adjusted position by action of suitable locking means comprising an adjustable screw 100 threaded in said second plate 86 in operative engagement with said inner sleeve 78 to prevent movement thereof, and a second adjustable screw 101 also threaded in said second plate in operative engagement with the said third plate 87', thus preventing rotary motion of said inner sleeve 78 with respect to said central sleeve 76 if so desired for set-up purposes.

With reference to Figure 10 of the drawings, in order to effect power rotation of the telescoping sleeve assembly 72 independently and as a unit to impart various translatory motions aforesaid to the electrode 11, suitable motion transmitting trains and selectors have been provided including an electric motor 102 or the like mounted on the housing 9 in any suitable manner. The output shaft of said motor 102 terminates in a bevel gear 103 which meshes with and drives a second bevel gear 104 as shown also in Figure 16 of the drawings. The said gear 104 is slidably keyed on shaft 105 journaled in said housing 9, by action of a key 106. The said gear 104 is normally held in engagement with said gear 103 by action of a spring 107 interposed between said gear 104 and a fixed collar 108 on said shaft 105. A worm, indicated generally by 109, is attached to the end of said shaft 105 by any suitable means and is in engagement with and drives a worm gear 110.

The said gear 110 is suported for free rotation on shaft 111 whose upper end, as shown, is journaled in a bore 112 formed in clutch member 113. A clutch member 114 is slidably splined on said shaft 111 so that when said clutch member 114 is shifted to engage clutch teeth 115 formed on the end of gear 110, as shown, the gear 110 will drive shaft 111. The shaft 111 drives gear 116 mounted thereon, as shown in Figure 11 of the drawings, which in turn meshes with and drives gear 117. With reference to Figure 10 of the drawings, gear 117 is in engagement with and drives a gear 118 formed circumferentially about the periphery of said outer sleeve 73 of said telescoping sleeve assembly 72. Therefore, it can be seen that as long as the clutch member 114 is in the position shown, the telescoping sleeve assembly 72 will be independently rotated as a unit by the prime mover 102.

Figure 16:
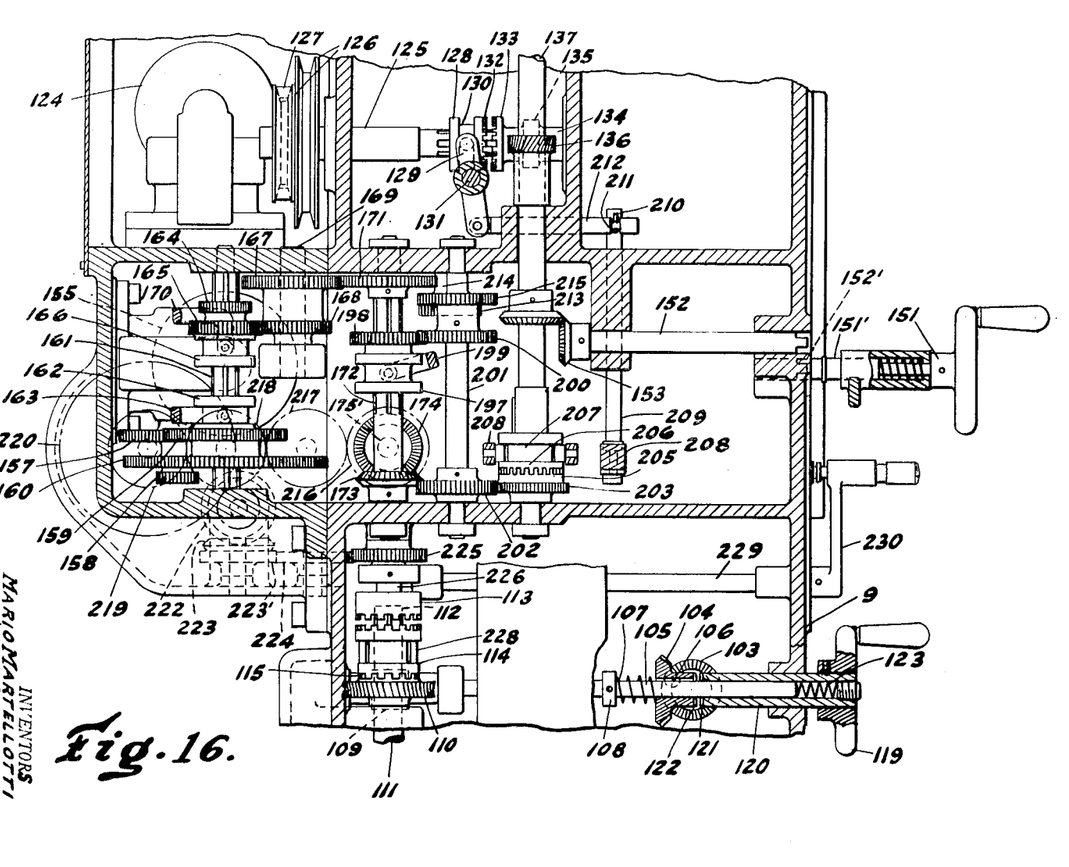
Figure 16 is a sectional view of the gearing mechanism utilized for effecting variously coordinated electrode movements as viewed along the line 16—16 of Figure 10.

Manual means have also been provided to independently rotate the telescoping sleeve assembly 72 as a unit and consisting essentially of a handwheel 119, Figure 16, mounted on a hollow shaft 120 which is journaled in housing 9 and having said shaft 105 slidably mounted therewithin. The said shaft 120 has clutch teeth 121 formed on the end thereof so that if the said handwheel 119 is urged to the left as shown, the teeth 121 will first mesh with clutch teeth 122 formed on the hub of gear 104, and further movement will effect disengagement of said gears 104 and 103.

Therefore, it can be seen that as long as the handwheel 119 is urged to the left as viewed, the said telescoping sleeve assembly 72 may be manually rotated by handwheel 119 through gear 104, shaft 105, worm 109, gear 110, clutch 114, and shaft 111 as shown in Figure 16, gear 116 and gear 117 as shown in Figure 11, and finally gear 118 and telescoping sleeve assembly 72 as shown in Figure 10.

Separate power operable means and selector means have been provided for driving the spindle and attached electrode 11. Referring to Figure 16, the power operable means includes a second prime mover 124 such as an electric motor or the like mounted within said housing 9 in any suitable manner. The output shaft, not shown, of said prime mover 124 is operatively connected to and drives a shaft 125, by suitable pulleys 126 and belt 127 operating all in a conventional manner. One end of shaft 125 is splined and supports and drives a clutch member 128 slidably mounted thereon. A shifter fork 129 is provided and is fitted in a shifter groove 130 of said clutch member 128 in a conventional manner so that as the clutch selector or operating lever 131, as shown in Figure 10 of the drawings, is manipulated, the clutch member 128 will be shifted to the right, as viewed, such that the gear teeth 132 formed on the end thereof will engage and drive clutch member 133 mounted for free rotation on a shaft 134 journaled in said housing 9.

A gear 135 formed integral with the clutch 133 mates with and drives gear 136 mounted on shaft 137 journaled in said housing 9. With reference to Figure 10 of the drawings, the upper end of shaft 137, as viewed, terminates in a gear 138 which meshes with and drives gear 139, through which slides a splined spindle drive 140 rotatably mounted in a hollow threaded fixed screw 141. The lower end of said shaft 140, as viewed, is integrally connected to a housing 142 by means of pin 143. With reference to Figures 14 and 17 of the drawings, the said housing 142 has a circular gimbal ring 144 pivotably connected thereto by pins 143; the ring 144, in turn, is pivotally connected to the upper end of a tubular member 145, as viewed, by suitable pins 144', thus forming a universal joint.

The lower end of said tubular member 145 is also pivotally connected by pins 144", Figure 14, to a second circular ring 147 which, in turn, is pivotably connected by pins 143" to a cylindrical member 148, Figure 10, which is secured to said spindle 80 between the shoulder 149 on the spindle and lock nut 150 threaded on the upper end of spindle 80 which carries the electrode.

Therefore, it can be seen that if the clutch selector lever 131 is manipulated to engage the clutch member 128, Figure 16, with clutch member 133, the rotational movement of the output shaft of said prime mover 124 will be converted by the spindle transmission just described into rotary motion of said electrode 11 about its own axis.

Manual means have also been provided to effect rotation of said electrode 11 independently about its own axis. With reference to Figure 16 of the drawings, said manual means consists essentially of a handwheel 151. This handwheel is supported on the end of a stub shaft 151' which is journaled in the end of a lever arm 250 mounted on the end of a shifter shaft 251 journaled in housing 9. By rotating the lever arm by means of the handwheel, the handwheel may be placed in three different positions, in one of which the stub shaft 151' which has a cross slot 152' in the end is positioned in a bore containing the tongended shaft 152, whereby insertion operatively joins the shaft 151' with the shaft 152 for rotation by the handwheel. The shaft 251 serves as an interlock to disengage the power clutch 128 from the spindle drive motor 124 during manual operation.

The opposite end of said shaft 152 carries a gear 153 in engagement with a gear 154 mounted on said shaft 137. Therefore, it can be seen that if clutch member 128 is disengaged, the handwheel 151 may be operated to engage said shaft 152 and may be rotated to effect a manual rotation of said shaft 137, thence said electrode 11.

The means for feeding the electrode toward the work, as shown in Figures 14 and 16 of the drawings, consists essentially of a suitable servomotor 155 or the like mounted within said housing 9 and having an output shaft 156, the rate and direction of which is controlled by the electrical conditions existing between the electrode 11 and work 12 as will subsequently be described.

The output shaft 156 drives a pair of gears 157 and 158 mounted thereon. A second pair of gears, 159 and 160, are slidably mounted on a splined shaft 161 parallel to shaft 156 for alternative engagement with one or the other of said gears 157 or 158 for speed change purposes. Therefore, a gear shifter numeral 162 has been provided to effect mesh of either gears 158 and 160, or gears 157 and 159, and is slidably mounted on the splined shaft 161 and operable by a shifting lever 163 journaled in said housing 9.

With reference to Figure 16 of the drawings, gears 157 and 159 are shown in mesh, but if the clutch member 162 is shifted downward, as viewed, by manipulation of lever 163, gears 157 and 159 will be disengaged, and gears 158 and 160 will be engaged to drive said shaft 161. Said shaft 161 drives a gear pair 164 and 165 slidably mounted thereon, and operable by a second shifter 166 for alternative engagement with either gear of a gear pair 167, 168 connected together and journaled on a shaft 169 mounted in said housing 9 parallel to said shaft 161. A shifter lever 170 is provided to actuate the shifter member 166 to engage either gears 165 and 168, or gears 164 and 167 dependent upon the speed ratio desired.

Said gear 167 is in mesh with and drives a gear 171 mounted on a partially splined shaft 172 journaled in said housing 9 which, in turn, drives a bevel gear 173 fixed thereto. Said bevel gear 173 meshes with and drives a second bevel gear 174 mounted on a shaft 175' journaled in said housing 9. With reference to Figure 14, shaft 175' constitutes the input shaft of a conventional "pick-off" speed or gear changing box comprising a plurality of removable or "pick-off" gears indicated generally by the reference numeral 175. The output shaft 176 of said gear box is journaled in said housing 9 and drives a helical gear 177 mounted on the end thereof which in turn meshes with and drives a second helical gear 178 for free rotation on shaft 183.

With reference to Figure 10 of the drawings, gear 178 has clutch teeth 180 formed thereon for mesh with a clutch member 182 slidably splined shaft 183, said clutch member 182 being shiftable by lever 184 oscillatably mounted in housing 9 as shown in Figure 14. When the clutch 182 is in the position shown, gear 178 will effect rotation of shaft 183 which, in turn, will drive gear 185 mounted on the upper end thereof. Gear 185 is in mesh with and drives gear 186 which is mounted on the upper end of feed screw 141. Said screw 141 is free to rotate, but axial movement thereof is prevented.

The said screw 141 is threaded in nut member 187 which is secured to a nut guide 188 and a housing member 189 by suitable bolts not shown. The housing 189 rotatably supports the housing 142 by suitable bearing members 190 interposed therebetween and locked thereto by a lock nut 191 threaded on the upper end of the housing 142. With reference to Figure 17 of the drawings, the said nut guide 188 prevents rotational movement of the nut 187 shown in Figure 10 by riding on fixed guide rods 192.

It is now evident that the feed screw 141, shown in Figure 10, causes vertical movement of said nut 187 and thence the electrode 11 through housing 189, housing 142, coupling 145, spindle 80, and chuck 83. It is also evident that since the screw 141 is operatively rotated by servo-motor 155, shown in Figure 16 and that the direction and rate of rotation of said servo-motor 155 is controlled by the rate of metal removal from the work, as will subsequently be shown, the electrode 11 will be fed toward the work 12 at a rate equal to the rate of metal removal therefrom, all of which constitutes a servo-controlled screw and nut means for feeding the electrode at a rate dependent only upon the rate of metal removed from the work 12, and thus useful for drilling operations.

Manual feeding means have also been provided for adjusting the electrode 11 toward and away from the work. Said means consists of a handwheel 193, as shown in Figures 1 and 14 having a shaft 194 journaled in the end of shifter shaft 184' which supports the shifter 184 previously described. The shaft 194 has a slotted end 194a for engagement with the tong end 194b of shaft 195' when inserted in the bore 194c supporting the end of shaft 195'. The lever 194' forms part of an interlock to insure that the clutch 182 is disengaged when the handwheel is swung into position for manual operation of shaft 183. The shaft 195' drives a bevel gear 195 mounted on the end thereof shown in Figure 10. Gear 195 meshes with bevel gear 196 mounted on the shaft 183. Therefore, it can be seen that the clutch member 182 is shifted upward to disengaged position upon movement of handwheel to engaged position, and thus the handwheel 193 may be rotated to effect a manual feeding of the electrode 11 toward and away from the work 12 through shaft 195', gears 195 and 196, shaft 183, gears 185 and 186, and feed screw 141.

Proper gearing and shiftable clutching means have also been provided for effecting coordination of the rotation of said electrode with its axial feed for automatically tapping, or simultaneously drilling and tapping a hole in a work piece. With reference to Figure 16, said means consists essentially of a gear 198 slidably splined on shaft 172 and actuable by shift lever 199 fitting in shifter groove 197. The gear 198 is shiftable into engagement with and drives a gear 200 fixed on shaft 201 journaled in said housing 9.

The shaft 201 drives a gear 202 fixed thereon which meshes with a gear 203 mounted for free rotation on the spindle transmission drive shaft 137. Gear 203 has clutch teeth 205 formed integral therewith for engagement by clutch teeth 206 formed on a shiftable clutch 207 slidably keyed on shaft 137 for effecting rotation thereof. The said clutch member 207 is shifted by a shifted fork 208 attached to shifter shaft 251 as shown in Figure 14 and oscillated by handwheel 151 as explained.

Now, when it is desired to coordinate feed and rotation of the electrode, clutch 207 is shifted to engage with clutch teeth 205 of gear 203. Then, the servo-motor 155 will drive simultaneously the feed transmission and the spindle transmission.

With reference to Figure 16 of the drawings, interlocking means have been provided to prevent simultaneous operation of said clutch members 128 and 206, to prevent simultaneous driving of shaft 137 by prime mover 124 and servo motor 155. Said means consists essentially of a vertically slidable shaft 209 operable by shifter lever 208. A key member 210 is formed on the upper end of said shaft 209 for engagement with a groove 211 formed on a horizontally disposed shaft 212 slidably mounted in housing 9. One end of shaft 212 is pivotably connected to the lower end of the shifter lever 129 of clutch member 128 so that as the clutch member 128 is shifted to the left, as viewed, shaft 212 will be forced to the right, aligning groove 211 with key 210, thus permitting shaft 209 and clutch member 206 to be moved downward, key 210 moving into groove 211. On the other hand, with key 210 in locking position, clutch 128 is locked in position and cannot be shifted as long as clutch 206 is engaged. By the same token, if clutch 128 is shifted to engaged position, shaft 212 will be moved to the left, thus preventing shaft 209 and clutch 206 from being shifted downward to engaged position because key 210 cannot engage groove 211 but instead will come into contact with the periphery of shaft 212 and thus further movement thereof will be prevented. There has been provided an interlock to prevent the spindle transmission drive motor and the servo-feed motor from simultaneously operating the spindle drive shaft 137.

Reversing means has been provided in Figures 14 and 16 to reverse the direction of rotation of the spindle and electrode and consists essentially of an idler gear 213 mounted on a shaft 214 in mesh with a gear 215 mounted on shaft 201. Therefore, if the clutch member 197 is shifted upward, as viewed, by proper manipulation of lever 199, gear 198 will be meshed with gear 213 instead of with gear 200 as shown and thus the shaft 201 and the spindle transmission will be rotated in a reverse direction.

Proper gearing and shiftable clutching means have also been provided to coordinate the planetary motion of the electrode 11 with its axial feeding movement as when tapping or simultaneously drilling and tapping a hole having a diameter greater than the diameter of the electrode. In Figure 14 of the drawings, said means consists essentially of a gear 216 mounted on shaft 178' of the feed transmission in mesh with and driving a branch gear train simultaneously with the feed transmission comprising gears 217, 218, 219, 220, 221, 222, 223, 223', 224, 225, and output shaft 226. With reference to Figure 16 of the drawings, shaft 226 terminates in clutch member 113 adapted to be engaged by member 114 when shifted upward, as viewed in Figure 16, by action of a shifter fork 228 operable by a shifter shaft 229 journaled in said housing 9 and terminating in a shifter lever 230.

Therefore, when the clutch member 114 is shifted upward to engage clutch member gear 113, the branch gear train is connected to drive the sleeve assembly 72 by way of shaft 111, Figure 16, gears 116 and 117 shown in Figure 11, and finally gear 118 shown in Figure 10 as heretofore described. Thus, the servo-motor 155, the feed transmission, the branch gear train therefrom to clutch 114, and the gear train from the clutch to the sleeve assembly drive gear 118 constitutes means for effecting planetary motion of the electrode coordinated with its feeding movement.

From the foregoing description, it should now be evident with reference to Figure 16 that if clutch member 114 is shifted upward, as viewed, by manipulation of lever 230, and clutch member 207 is shifted downward by manipulation of lever 208, the said electrode movements, i. e., rotation, planetary motion, and axial feeding, will all be coordinated and servo driven and controlled by said servo-motor 155.

With reference to Figures 1 and 9 of the drawings, adjusting means have been provided for tilting the axis of the head structure 9 relative to the column 5 to avoid necessity of tilting the machine table 8. Said adjusting means consists essentially of an adjusting stud 231 mounted on column 5 of the machine and connected by a conventional worm and worm gear to the head. A scale 232 mounted on the head 9 and an indicator 233 mounted on the column indicates the amount of adjustment effected.

Coolant circulation means has been provided, comprising essentially of a coolant storage tank 234 containing an adequate supply of coolant 235, which is pumped or forced into a work tank 236 mounted on the table 8 surrounding the work piece 12, and proper pumping means indicated generally by the reference numeral 237. The said coolant pump 237 forces coolant into a flexible hose 238, down through the bore in said shaft 140, as shown in Figure 10 of the drawings, through a flexible hose 239 connecting said shaft 140 with said spindle 80, through the bore of said spindle 80, chuck 83 and electrode 11 and into the work tank 236 as shown in Figure 1 of the drawings. The coolant 235 thereafter flows back into the reservoir 234 by gravity from the work tank 236 by way of a hose 239 connected therebetween.

An electrical control circuitry has been provided to control the feed in accordance with the rate of switch removal which will be described by way of a description of an actual working condition or cycle of operation.

Figure 23:
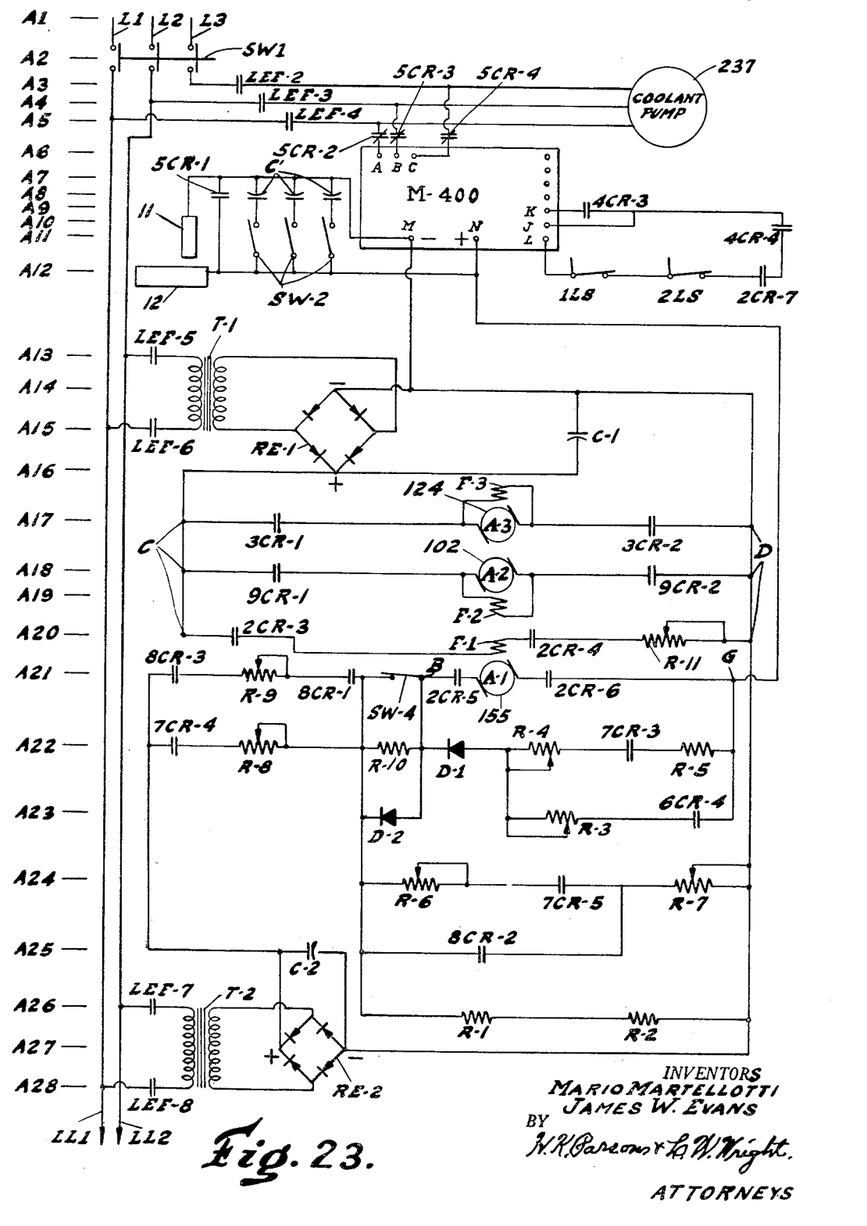
Figures 23 and 24 are schematic wiring diagrams of the associated electrical circuitry.
Figure 24:
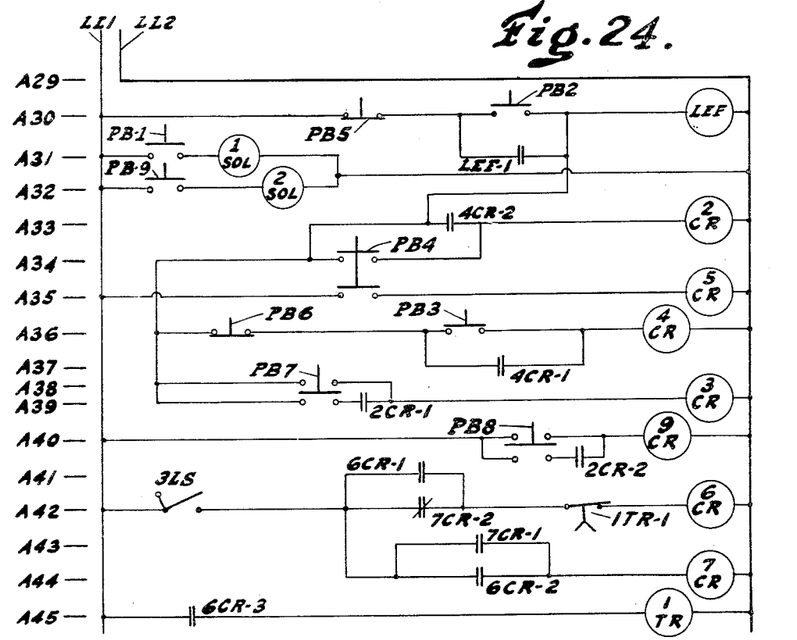

To facilitate location of the electrical components, of which reference is to be made, and to enhance the free flowing description thereof, it will be noted at the outset that Figures 23 and 24, which comprise the circuit, have been provided with a numerical scale located vertically on the left of each figure, forming horizontal consecutively numbered lines from A1 to A46. Therefore, it will be observed that each electrical component will be located with reference to said lines.

When the main power switch SW1 on line A2 is closed, three phase power will be connected from the power source through lines L1, L2, and L3 to energize the feed lines LL1 and LL2. As the "fill tank" pushbutton PB1 on line A31 is actuated, solenoid 1SOL will be energized which operates proper valve means, not shown, to permit the work tank 236, as shown in Figure 1 of the drawings, to be filled to a proper level with a dielectric coolant 235 from the reservoir tank 234.

Now, as the "master start" push button PB2 on line A30 is actuated, relay coil LEF will be energized, which will close contacts LEF-1 on line A31 to latch around the pushbutton PB2 and close contacts LEF-2, LEF-3, and LEF-4 on lines A3, A4 and A5 respectively to energize the coolant pump 237, close contacts LEF-5 and LEF-6 on lines A13 and A15 respecively to energize the power transformer T1 and thus energize the full wave rectifier bridge RE-1 connected thereto, and close contacts LEF-7 and LEF-8 on lines A26 and A28 respectively to energize the power transformer T2 and thus energize the full wave rectifier bridge RE-2 connected thereto.

When contacts LEF-2, 3, and 4 are closed the coolant pump 237 will be energized to circulate the coolant 235 through the hollow electrode 11 and into the work tank 236, and also will energize the gap voltage power supply M-400. As the power supply M-400 is commercially available on the market as manufactured by the Elox Corporation and forms no part of the present invention, a detailed description of the circuitry contained therein will be omitted and will be shown only as a block diagram as view.

Now, as the "cycle start" pushbutton PB-3 on line A36 is actuated, relay coil 4CR will be energized, which will close contacts 4CR-1 on line A37 to latch around the pushbutton PB-3, close contacts 4CR-2 on line A33 to energize relay coil 2CR, and close contacts 4CR-3, and 4CR-4 on lines A9 and A10 respectively to permit the electrode 11 and work 12 to be energized by the power supply M-400.

When control relay 2CR is energized, contacts 2CR-1 on line A39 close, contacts 2CR-2 on line A41 close, contacts 2CR-3 and 2CR-4 on line A20 close to energize the field coil F-1 of the gap determining feed motor 155, contacts 2CR-5 and 2CR-6 on line A21 close to energize the armature A-1 of said motor 155, and contacts 2CR-7 on line A12 close.

When contacts 2CR-7 are closed, the direct current voltage produced by the gap voltage power supply M-400 will be supplied to its positive and negative output terminals N and M, respectively, which, in turn, are connected to the electrode 11 and the work piece 12 respectively. Condensers C' are connected across the discharge gap by suitable series connected switches SW-2 to produce the desired pulsating discharges across the gap between the electrode 11 and work 12 to effect the machining operation. As contacts 2CR-3 and 2CR-4 on line A20 are now closed, the field winding F-1 will be connected across the full wave rectifier RE-1 whose output is properly filtered by a parallel connected condenser C-1. Now, as contacts 2CR-5 and 2CR-6 are closed, a positive voltage from the terminal N of the gap voltage power supply M-400 will be supplied to terminal G, and thus the armature A-1 of the electrode feed motor 155 will begin to rotate at a speed dependent upon the value of resistors R-1 and R-2, which are connected in series with the armature A-1 and the power supply M-400.

The armature A-1 of the electrode feed motor 155 will be rotated in such a direction that the electrode 11 driven thereby will be traversed toward the work 12 at a rapid traverse rate. As the electrode 11 approaches the work 12, the dimension of discharge gap therebetween will be reduced more and more until the ionization potential gradient of the gap is reached. When the ionization potential is reached, a series of electrical discharges will be discharged across the gap from the electrode 11 toward the work 12 in such a manner that particles of metal will be removed from the work.

Just before the ionization potential is reached, the electrode 11 during said rapid traverse will cause a micro-switch 3LS, shown in Figure 17, and also shown electrically on line A42, to be closed. When the switch 3LS is closed, relay coil 6CR will be energized to close contacts 6CR-1 on line A41, close contacts 6CR-2 on line A44 to energize relay coil 7CR, close contacts 6CR-3 on line A45 to energize a timer relay coil 1TR, and close contacts 6CR-4 on line A23 to provide dynamic braking to the armature A-1 dependent upon the valve on the shunt connected resistor R-3.

When the relay coil 7CR is energized, contacts 7CR-1 on line A43 close to maintain coil 7CR energized, contacts 7CR-2 on line A42 open, but coil 6CR remains energized, contacts 7CR-3 on line A22 close to insert resistors R-4 and R-5 in parallel with resistor R-3 and thus producing more dynamic braking on the armature A-1, depending on the value of said series resistors R-4 and R-5, contacts 7CR-4 on line A22 close, thus connecting the positive terminal of the rectifier unit RE-2 to terminal B of the armature A-1 through series connected resistor R-8, and contacts 7CR-5 on line A24 close to present a preset load across the rectifier unit RE-2 and as the rectifier RE-2 is unregulated, the voltage output therefrom will be dependent upon the value of the series connected adjustable resistors R-6 and R-7.

Therefore, as the actual value of the actual gap voltage appears at terminal G of the armature A-1 and as the voltage from the rectifier unit RE-2, being properly filtered by filter condenser C-2, is connected to terminal B of the armature A-1, the armature will rotate in a direction and at a rate proportional to the difference between the actual gap voltage and the voltage produced by the rectifier unit RE-2. Therefore, it can be seen that the voltage produced by the rectifier unit can be referred to as a "reference voltage" which represents the desired value of gap voltage to be maintained. Therefore, when the value of the actual gap voltage at terminal G of the armature A-1 is equal to the desired gap or reference voltage from the rectifier RE-2 at terminal B of the armature A-1, the armature will stop and will not rotate further. If the reference voltage is made greater than the gap voltage, the armature A-1 will reverse direction of rotation and will be rotated at a rate proportional to the difference between said voltages.

As the output voltage from the rectifier RE-2 is not regulated, the voltage appearing at terminal B will be dependent upon the loading effect produced thereon by series connected resistors R-6 and R-7 on line A24 minus the voltage drop across resistor R-8 on line A22. Therefore, by proper manipulation of the valve of resistors R-6, R-7, and R-8, the voltage appearing at terminal B may be manually set at any predetermined value.

It has now been shown that the armature A-1 will at this point rotate at such a speed that the electrode 11 will be traversed slowly toward the work 12 until the ionization potential of the discharge gap is reached; at such time a series of electrical discharges will be erupted across said gap from the electrode 11 toward the work 12. As the gap between the electrode 11 and work 12 is decreased further, the gap current will be increased a proportional amount, and as the output voltage from the power supply M-400 is unregulated, the voltage appearing across the gap will be decreased to a value proportional to the gap dimension.

Therefore, it can be seen that as the electrode 11 is slowly fed toward the work 12 during the so-called "working region" the gap voltage appearing at terminal G will decrease until the voltage thereon is equal to the value of the reference voltage appearing at terminal B. At this point, as there is an equal potential on either side of the armature A-1, the armature will cease to rotate, and thus the electrode 11 will be stopped. The timer relay 1TR on line A45 may be preadjusted so that its contacts 1TR-1 on line A42 will not open immediately when its coil 1TR on line A45 is energized but will be timed to open when the armature A-1 has stopped the electrode 11 in its desired position.

As contacts 1TR-1 will open at this point, relay coil 6CR will be deenergized to open contacts 6CR-1 on line A41, open contacts 6CR-2 on line A44 but relay coil 7CR will remain energized, open contacts 6CR-3 on line A45 to deenergize the timer relay coil 1TR and will open contacts 6CR-4 on the line A23 to remove resistor R-3 from the armature circuit and thus remove the dynamic braking effect on armature A-1.

Therefore, as the electrical discharges are fired across gap from the electrode 11 to the work 12, small particles of metal will be removed from the work 12 and thus the gap distance will tend to increase which, in turn, will cause an increase in gap voltage. As the gap voltage increases, the voltage at terminal G will also increase, and thus the armature A-1 will rotate in a direction to reposition the electrode 11 to maintain at all times a constant gap between said electrode 11 and work 12 during the machining operation. When the electrode 11 has machined a hole or slot in the work 12 to a proper depth, limit switch 2LS on line A12, which has been positioned so as to be actuated by said electrode 11 at this point, will be opened thereby to remove the voltage from terminals M and N of the power supply M-400, and thus reduce the voltage at terminal G to zero. As the reference voltage at terminal B now is greater than the gap voltage at terminal G, the armature A-1 will reverse direction of rotation and will withdraw the electrode 11 from the work 12 at a rapid traverse rate.

When the electrode 11 is fully retracted, a dog, not shown but carried by the electrode 11, will operate the stop pushbutton PB-5 on line A30 to deenergize relay coil LEF, which in turn opens contacts LEF-7 and LEF-8 on lines A26 and A28, respectively, to deenergize the reference voltage power supply RE-2 to stop rotation of the armature A-1.

If, for some reason, it is desired to retract the electrode manually without the use of the limit switch 2LS on line A12, the electrode retract pushbutton PB-4 on line A34 and A35 may be actuated to energize the relay coil 5CR. When the relay coil 5CR is energized, contacts 5CR-1 on line A8 will close to short the electrode 11 to the work 12, and contacts 5CR-2, 5CR-3, and 5CR-4 on line A5 will open to deenergize the power supply M-400 and thus again reducing the gap voltage at terminal G to zero and the electrode 11 will be retracted in the same manner as heretofore shown.

Auxiliary motors 102 and 124, shown on lines A18 and A17 respectively, may be energized to provide independent rotational power by actuation of pushbuttons PB8 on line A40 and/or PB7 on line A38 respectively.

While the invention has been described with considerable detail, it is not to be limited to the particular construction shown, and it is the intention to cover hereby all adaptations, modifications, and uses thereof which come within the practice of those skilled in the art to which it relates and within the scope of the appended claims.

What is claimed is:

1. In an electrical discharge machine of the character described having a work table and a tool head mounted on the machine in spaced relation with the axis of said head substantially perpendicular to the work surface of said table, the combination of a telescoping sleeve assembly including a plurality of non-concentric sleeves journaled in said head for rotation about the axis of said head, an axially movable spindle mounted in the central sleeve of said assembly for supporting an electrode for axial feeding, a source of electrical energy connected to said electrode and work support to produce a series of electrical discharges therebetween, means to relatively adjust said elements to effect lateral shifting of the axis of said spindle and electrode relative to the axis of said head to position the electrode axis as an element of a cylindrical surface whereby rotation of said assembly causes said electrode to generate a cylindrical surface, an electrical power operable means having motion transmitting connections to effect axial feeding of said spindle and electrode and to effect rotation of said sleeve assembly, and an electric circuit means responsive to the electrical characteristics of said electrical discharges for controlling the rate and direction of said power operable means.

2. In an electrical discharge machine of the character described having a work table with a work supporting surface and a swivelable electrode supporting head mounted thereon in spaced relation whereby the axis of said head is normally perpendicular to the plane of said work surface, the combination of means to adjustably incline the axis of said head relative to said perpendicular axis, a telescoping sleeve assembly journaled in said head for rotation about the axis of said head, an axially movable spindle mounted in said sleeve assembly for supporting an electrode for axial feeding, a source of electrical energy connected to said electrode and work support to produce a series of electrical discharges therebetween, means to adjust the elements of said sleeve assembly to laterally shift the axis of said spindle and electrode relative to the axis of said head to position the electrode as an element of a cylindrical surface whereby rotation of said sleeve assembly causes said electrode to generate a cylindrical surface, an electrical power operable means having motion transmitting means operably connected to effect axial feeding of said spindle and electrode and to effect rotation of said sleeve assembly and an electric circuit means responsive to the electrical characteristics of said electrical discharges for controlling said power operable means.

3. In an electrical discharge machine having a work table and a tool head mounted on the machine in spaced relation, the combination of a telescoping sleeve assembly including a plurality of sleeve elements, one of which is inclined, journaled in said head for rotation about an axis substantially normal to said table, an axially movable spindle mounted in the central sleeve of said assembly for feeding an electrode to and from the table, a source of electrical energy connected to said electrode and work support to produce a series of electrical discharges therebetween, means to adjust relatively the elements of said assembly to selectively incline the axis of said spindle and electrode to position the electrode as an element of a conical surface resting on the table whereby rotation of said assembly causes said electrode to generate a conical surface, an electrical power operable means having motion transmitting connections to effect axial feeding of said spindle and electrode and to effect rotation of said sleeve assembly, and an electric circuit means responsive to the electrical characteristics of said electrical discharges for varying said power operable means.

4. In an electrical discharge machine of the character described having a work table with a work supporting surface and an electrode supporting head mounted thereon in spaced relation whereby the axis of said head is substantially perpendicular to the plane of said work surface, the combination of a telescoping sleeve assembly journaled in said head for rotation about the axis of said head, said assembly including a plurality of sleeves, one of which is inclined and another eccentric to the assembly axis, an axially movable spindle mounted in said sleeve assembly for supporting an electrode for axial feeding, a source of electrical energy connected to said electrode and work support to produce a series of electrical discharges therebetween, means to adjust relatively the elements of said sleeve assembly to selectively incline the axis of said spindle and electrode relative to the axis of said head to position the electrode as an element of a conical surface whereby rotation of said sleeve assembly causes said electrode to generate a conical surface, additional means to adjust relatively the elements of said sleeve assembly to laterally shift the axis of said electrode to change the dimensions of said conical surface, an electrical power operable means having motion transmitting means operatively connected to effect axial feeding of said spindle and electrode and to effect rotation of said sleeve assembly, and an electric circuit means responsive to the electrical characteristics of said electrical discharges for controlling said power operable means.

5. In an electrical discharge machine of the character described having a work table with a work supporting surface and a swivelable electrode supporting head mounted thereon in spaced relation, the combination of means to adjustably incline the axis of said head relative to an axis normal to said table, a telescoping sleeve assembly including an inclined sleeve journaled in said head for rotation about the axis of said head, an axially movable spindle mounted in the inner sleeve of said assembly for supporting an electrode for axial feeding, a source of electrical energy connected to said electrode and work support to produce a series of electrical discharges therebetween, means to adjust relatively the elements of said sleeve assembly to selectively incline the axis of said spindle relative to the axis of said head to position the electrode as an element of a conical surface whereby rotation of said sleeve assembly causes said electrode to generate a conical surface, a variable electrical power operable means having motion transmitting connections to effect axial feeding of said spindle and electrode, and to effect rotation of said sleeve assembly, and an electric circuit means responsive to the electrical characteristics of said electrical discharges for controlling the variation of said power operable means.

6. In an electrical discharge machine of the character described having a work table and a tool head pivotally mounted on the machine in spaced relation to said table, the combination of means to adjust said head to incline its axis relative to the surface of said table, a telescoping sleeve assembly including inclined and eccentric sleeves journaled in said head for rotation about the axis of said head, an axially movable spindle mounted in the central sleeve of said assembly for supporting an electrode for axial feeding, a source of electrical energy connected to said electrode and work support to produce a series of electrical discharges therebetween, means to adjust relatively the elements of said sleeve assembly to selectively incline the axis of said spindle and electrode relative to the axis of said head to position the electrode as an element of a conical surface whereby rotation of said sleeve assembly causes said electrode to generate a conical surface, additional means to adjust relatively the elements of said sleeve assembly to laterally shift the axis of said electrode to change the dimensions of said conical surface, a variable electrical power operable means having motion transmitting means operatively connected to effect axial feeding of said spindle and electrode and to effect rotation of said sleeve assembly, and an electric circuit means responsive to the electrical characteristics of said electric discharges for varying the rate of operation of said power operable means.

7. In an electrical discharge machine of the character described having a work table with a work supporting surface and an electrode supporting head mounted thereon in spaced relation whereby the axis of said head is substantially perpendicular to the plane of said work surface, the combination of an axially movable spindle mounted in said head for supporting a threaded electrode for axial feeding and rotation, a source of electrical energy connected to said electrode and work support to produce a series of electrical discharges therebetween, an electrical power operable means having motion transmitting means operatively connected to effect a coordinated axial feeding and rotation of said spindle and electrode and an electric circuit means responsive to the electrical characteristics of said electrical discharges for controlling said power operable means.

8. In an electrical discharge machine of the character described having a work table with a work supporting surface and an electrode supporting head mounted thereon in spaced relation whereby the axis of said head is substantially perpendicular to the plane of said work surface, the combination of a telescoping sleeve assembly including a pair of eccentric sleeves journaled in said head for rotation about the axis of said head, an axially movable spindle mounted in said sleeve assembly for supporting an annular grooved electrode for axial feeding and rotation, a source of electrical energy connected to said electrode and work support to produce a series of electrical discharges therebetween, means to adjust relatively said eccentric sleeves to laterally shift the axis of said spindle and electrode relative to the axis of said head to position the electrode as an element of a cylindrical surface whereby rotation of said sleeve assembly causes said electrode to generate a cylindrical surface, a reversible electrical power operable means having motion transmitting means operatively connected to effect axial feeding of said spindle and electrode and to effect rotation of said sleeve assembly coordinated with the feeding of said electrode, and an electric circuit means responsive to the electrical characteristics of said electrical discharges for controlling the reversible operation of said power operable means.

9. In an electrical discharge machine of the character described having a work table with a work supporting surface and an electrode supporting head mounted thereon in spaced relation whereby the axis of said head is substantially perpendicular to the plane of said work surface, the combination of a telescoping sleeve assembly journaled in said head for rotation about the axis of said head, an axially movable spindle mounted in said sleeve assembly for supporting a threaded electrode for axial feeding and rotation, a source of electrical energy connected to said electrode and work support to produce a series of electrical discharges therebetween, means to adjust the elements of said sleeve assembly to laterally shift the axis of said spindle and electrode relative to the axis of said head to position the electrode as an element of a cylindrical surface whereby rotation of said sleeve assembly causes said electrode to generate a cylindrical surface, an electrical power operable means having motion transmitting means operatively connected to effect a coordinated axial feeding and rotation of said spindle and electrode and operatively connected to effect rotation of said sleeve assembly in synchronized relation to the rotation of said electrode and an electric circuit means responsive to the electrical characteristics of said electrical discharges for controlling said power operable means.

10. In an electrical discharge machine of the character described having a work table with a work supporting surface and a swivelable electrode supporting head mounted thereon in spaced relation whereby the axis of said head is normal perpendicular to the plane of said work surface, the combination of means to adpustably incline the axis of said head relative to said perpendicular axis, a telescoping sleeve assembly journaled in said head for rotation about the axis of said head, an axially movable spindle mounted in said sleeve assembly for supporting an annular grooved electrode for axial feeding and rotation, a source of electrical energy connected to said electrode and work support to produce a series of electrical discharges therebetween, means to adjust the elements of said sleeve assembly to laterally shift the axis of said spindle and electrode relative to the axis of said head to position the electrode as an element of a cylindrical surface whereby rotation of said sleeve assembly causes said electrode to generate a cylindrical surface, an electrical power operable means having motion transmitting means operatively connected to effect axial feeding of said spindle and electrode and operatively connected to effect rotation of said sleeve assembly coordinated with the feeding of said electrode and an electric circuit means responsive to the electrical characteristics of said electrical discharges for controlling said power operable means.

11. In an electric discharge machine of the character described having a work table and a tool head mounted on the machine in spaced relation, the combination of a telescoping sleeve assembly including a plurality of nonconcentric sleeves, means to journal said assembly in the head for rotation about the axis of the outer sleeve of said assembly, a tool spindle journaled in the central sleeve of said assembly, a prime mover and a spindle transmission actuable thereby and operatively connected for rotating said spindle, said spindle being adapted to support an electrode, a feed transmission including a servo-motor operatively connected for feeding said spindle and central sleeve relative to said assembly, a source of electrical energy connectible to said electrode and work table to produce a series of electrical discharges therebetween, an electric circuit having means responsive to the electrical characteristics of said electrical discharges for controlling the rate and direction of said servo-motor, and means to disconnect said spindle transmission from its prime mover and connect the spindle transmission to said feed transmission for actuation by the servo-motor to synchronize the rate of rotation of the spindle with the rate of feeding thereof.

12. In an electric discharge machine of the character described having a work table and a tool head mounted on the machine in spaced relation, the combination of a telescoping sleeve assembly including a plurality of nonconcentric sleeves, means to journal said assembly in the head for rotation about the axis of the outer sleeve of said assembly, a tool spindle journaled in the central sleeve of said assembly, a prime mover and a spindle transmission actuable thereby and operatively connectible for rotating said spindle, said spindle being adapted to support an electrode, a feed transmission including a servo-motor operatively connected for feeding said spindle and central sleeve, a source of electrical energy connected to said electrode and work support to produce a series of electrical discharges therebetween, an electric circuit having means responsive to the electrical characteristics of said electrical discharges for controlling the rate and direction of said servo-motor, means to disconnect said spindle transmission from its prime mover and connect said spindle transmission to said feed transmission to synchronize the rate of rotation of the spindle with the rate of feeding thereof, and change speed gearing in said feed transmission to vary the rate of feeding with respect to the rate of rotation of said spindle.

13. In an electric discharge machine of the character described having a work table and a tool head mounted on the machine in spaced relation, the combination of a telescoping sleeve assembly including a plurality of non-concentric sleeves, means to journal said assembly in the head for rotation about the axis of the outer sleeve of said assembly, a tool spindle journaled in the central sleeve of said assembly for supporting an electrode, a spindle transmission for rotating said spindle including a prime mover, said transmission including an intermediate drive shaft, a servo-motor and feed transmission driven thereby for feeding the spindle and central sleeve relative to said assembly, a source of electrical energy connected to said electrode and work support to produce an electrical potential therebetween, an electric circuit having means responsive to the characteristics of said potential for controlling the rate and direction of said servo-motor, manually operable means including an oscillatable crank arm having a hand wheel journaled in the end thereof for swinging said arm to a first position to effect operative engagement of the hand wheel with said intermediate drive shaft, means operable in response to the swinging of said arm to said first position to prevent connection of said prime mover to the spindle transmission, and additional means operable by the arm upon swinging to a second position to connect the feed transmission to said intermediate shaft for power actuation by the servo-motor to synchronize the rate of rotation of said spindle with the rate of feeding thereof.

14. In an electric discharge machine of the character described having a work table and a tool head mounted on the machine in spaced relation, the combination of a telescoping sleeve assembly including a plurality of non-concentric sleeves, means to journal said assembly in the head for rotation about the axis of the outer sleeve of said assembly, a tool spindle journaled eccentrically in the center sleeve of said assembly, means to effect relative rotation between said center sleeve and the remaining sleeves to shift the axis of the spindle eccentric to the axis of rotation of said assembly, a prime mover and a spindle transmission actuable thereby and operatively connectible for rotating said spindle, said spindle being adaptable to support an electrode, a feed transmission including a servo-motor operatively connected for feeding the central sleeve axially of said assembly, a source of electrical energy connected to said electrode and work table to produce a series of discharges therebetween, an electric circuit having means responsive to the electrical characteristics of said electrical discharges for controlling the rate and direction of said servo-motor, and manually operable means for rotating said assembly.

15. In an electric discharge machine of the character described having a work table and a tool head mounted on the machine in spaced relation, the combination of a telescoping sleeve assembly including a plurality of non-concentric sleeves, means to journal said assembly in the head for rotation about the axis of the outer sleeve of said assembly, one of said sleeves being angularly related to said axis of rotation and having a bore parallel to the axis of rotation of said assembly, a tool spindle guided in said last-named bore for axial movement parallel to the axis of said assembly, means to rotate said one sleeve relative to the outer sleeve to incline the axis of the spindle relative to the axis of rotation of said assembly, a prime mover and a spindle transmission actuable thereby and operatively connected for rotating said spindle, said spindle being adapted to support an electrode, a feed transmission including a screw and nut, said screw being axially fixed on the axis of rotation of said assembly, a servo-motor operatively connected for rotating said screw, said spindle transmission including a drive shaft extending through said screw, and a universal joint having one end journaled in said nut and movable therewith, and the other end operatively connected to said spindle for effecting rotation thereof in any of its angular positions.

16. In an electric discharge machine of the character described having a work table and a tool head mounted on the machine in spaced relation, the combination of a telescoping sleeve assembly including a plurality of non-concentric sleeves, means to journal said assembly in the head for rotation about the axis of the outer sleeve of said assembly, a tool spindle journaled eccentrically in the central sleeve of said assembly, power operable means for rotating said spindle, a second power operable means for driving said sleeve assembly, a feed transmission including a servo-motor operatively connected for feeding said spindle relative to said assembly, and means to disconnect said additional power operable means and connect said servo-motor for simultaneous actuation of said feed transmission and said sleeve assembly to synchronize their rates of movement.

17. In an electric discharge machine of the character described having a work table and a tool head mounted on the machine in spaced relation, the combination of a telescoping sleeve assembly including a plurality of non-concentric sleeves, means to journal said assembly in the head for rotation about the axis of the outer sleeve, a tool spindle journaled in the central sleeve of said assembly, said sleeves having means effective upon relative adjustment to shift the tool spindle eccentrically to the axis of rotation of said outer sleeve to angularly adjust the axis of the spindle relative to the axis of the outer sleeve, power operable means for rotating the spindle, a servo-motor operatively connected for feeding the spindle, a transmission for driving the sleeve assembly, manually operable means for actuating said last-named transmission and selector means alternatively operable for connecting the servo-motor or the manual means to said sleeve transmission and also operable to disconnect said sleeve tranmission from both of said actuating means.

18. In an electrical discharge machine of the character described having a work table with a work supporting surface and a swiveable electrode supporting head mounted thereon in spaced relation whereby the axis of said head is normally perpendicular to the plane of said work surface, the combination of means to adjustably incline the axis of said head relative to said perpendicular axis, a telescoping sleeve assembly journaled in said head for rotation about the axis of said head, an axially movable spindle mounted in said sleeve assembly for supporting a threaded electrode for axial feeding and rotation, a source of electrical energy connected to said electrode and work support to produce a series of electrical discharges therebetween, means to adjust the elements of said sleeve assembly to selectively incline the axis of said spindle and electrode relative to the axis of said head to position the electrode as an element of a conical surface whereby rotation of said sleeve assembly causes said electrode to generate a conical surface, means to adjust the elements of said sleeve assembly to laterally shift the axis of said electrode to change the dimensions of said conical surface, an electrical power operable means having motion transmitting means operatively connected to effect a coordinated axial feeding and rotation of said spindle and electrode and operatively connected to effect rotation of said sleeve assembly in synchronized relation to the rotation of said electrode, and an electric circuit means responsive to the electrical characteristics of said electrical discharges for controlling said power operable means.

19. In an electrical discharge machine of the character described comprising a work table having a work supporting surface and a swiveable electrode supporting head mounted therein in spaced relation whereby the axis of said head is normally perpendicular to the plane of said work support, the combination of means to adjustably tilt the axis of said head selected amounts, a telescoping sleeve assembly journaled in said head for rotation about an axis coincident with the axis of said head and comprising an outer sleeve journaled in said head having a driving gear formed thereabout and an inclined bore formed therein, the axis of which intersects the axis of said head, a central sleeve rotatably mounted in said inclined bore and having a bore formed therein, the axis of which is parallel to but eccentric with respect to the axis of said head, and an inner sleeve rotatably mounted in said eccentric bore and having a bore formed therein, the axis of which is coincident with the axis of said head, a rotatable spindle mounted in said coincident bore for axial feeding therethrough, a threaded electrode mounted on the end of said spindle, a source of electrical energy connected to said electrode and to said work support to produce a series of electrical discharges therebetween, adjusting means to rotatably adjust said outer and inner sleeves respectively relative to said central sleeve to tilt and to laterally shift the axis of said spindle selected amounts with respect to the axis of said head, an electric power operable means having motion transmitting means operatively connected to effect a coordinated axial feeding and rotation of said spindle and electrode and operatively connected to said driving gear to effect rotation of said sleeve assembly in synchronized relation to the rotation of said electrode, and an electric circuit means responsive to the electrical characteristics of said electrical discharges for controlling said power operable means.

No references cited.